(12) United States Patent
Castillo et al.

(10) Patent No.: US 9,896,334 B2
(45) Date of Patent: Feb. 20, 2018

(54) PROCESS FOR PURIFICATION OF HYDROFLUORIC ACID INCLUDING OBTAINING ARSENIOUS ACID BY-PRODUCT

(71) Applicant: Mexichem Fluor, Sociedad Anonima de Capital Variable, Matamoros, Tamaulipas (MX)

(72) Inventors: Iris Samantha Duran Castillo, Matamoros (MX); Juan Alberto juárez García, Matamoros (MX); Nilo Martínez Robles, Matamoros (MX)

(73) Assignee: Mexichem Fluor, Sociedad Anonima de Capical Variable, Matamoros (MX)

( * ) Notice: Subject to any disclaimer, the term of this patent is extended or adjusted under 35 U.S.C. 154(b) by 409 days.

(21) Appl. No.: 14/640,387

(22) Filed: Mar. 6, 2015

(65) Prior Publication Data
US 2016/0176711 A1   Jun. 23, 2016

(30) Foreign Application Priority Data
Dec. 18, 2014   (MX) .................. MX/A/2014/015885

(51) Int. Cl.
*B01D 3/14* (2006.01)
*C01B 7/19* (2006.01)
*C01G 28/00* (2006.01)
*B01D 3/00* (2006.01)

(52) U.S. Cl.
CPC ............. *C01B 7/196* (2013.01); *B01D 3/007* (2013.01); *B01D 3/143* (2013.01); *C01G 28/005* (2013.01); *C01G 28/007* (2013.01); *Y02P 20/129* (2015.11)

(58) Field of Classification Search
CPC ........ B01D 3/007; B01D 3/143; C01B 7/196; C01G 28/007; C01G 28/008
See application file for complete search history.

(56) References Cited

U.S. PATENT DOCUMENTS 3,166,379 A   1/1965   Bradley et al.
3,663,382 A   5/1972   Garris
3,687,622 A   8/1972   Garris
(Continued)

FOREIGN PATENT DOCUMENTS

CN   1931709 A   3/2007
CN   101597032 A   12/2009
(Continued)

*Primary Examiner* — Jonathan Miller
(74) *Attorney, Agent, or Firm* — Foley & Lardner LLP

(57) ABSTRACT

A process for purification of hydrofluoric acid reduces the content of heavy metals, including arsenic, to values lower than five parts per million, without using any chemicals and with an integrated design of hot and cold streams that provide low energy consumption. The process allows extraction of heavy metals, especially arsenic, with minimal waste generation and while maintaining an original oxidation state, which for the case of arsenic is +3, so that the residue can he converted into a product with commercial value, such as arsenious acid. The process includes operation of four systems, namely, a hydrofluoric acid purification system, an arsenic concentration system, a hot water system, and a cold water system. The extraction of heavy metals is performed by synchronized operations of these four systems.

15 Claims, 3 Drawing Sheets

(56) References Cited

U.S. PATENT DOCUMENTS

| | | | |
|---|---|---|---|
| 3,689,370 A | 9/1972 | Osaka et al. | |
| 4,032,621 A | 6/1977 | Meadows | |
| 4,083,941 A | 4/1978 | Jayawant et al. | |
| 4,491,570 A | 1/1985 | Wheaton et al. | |
| 4,668,497 A | 5/1987 | Miki | |
| 4,756,899 A | 7/1988 | Jenczewski et al. | |
| 4,929,435 A | 5/1990 | Boghean et al. | |
| 4,952,386 A | 8/1990 | Davison et al. | |
| 4,954,330 A | 9/1990 | Ziegenhain | |
| 4,960,580 A | 10/1990 | Gumprecht | |
| 4,990,320 A | 2/1991 | Gumprecht | |
| 5,047,226 A | 9/1991 | Schon | |
| 5,089,241 A * | 2/1992 | Smith | A62D 3/35 423/472 |
| 5,100,639 A | 3/1992 | Freire et al. | |
| 5,108,559 A | 4/1992 | Motz et al. | |
| 5,294,303 A * | 3/1994 | Robbins | B01D 3/007 202/205 |
| 5,362,469 A | 11/1994 | Seseke-Koyro et al. | |
| 5,722,442 A | 3/1998 | Hoffman et al. | |
| 5,749,245 A * | 5/1998 | Thomas | B01D 3/007 62/292 |
| 5,785,820 A * | 7/1998 | Hoffman | C01B 7/0706 159/47.1 |
| 6,063,356 A | 5/2000 | Hoffman et al. | |
| 6,346,227 B1 | 2/2002 | Lailach | |
| 2003/0057165 A1* | 3/2003 | Carson | B01D 3/007 210/774 |
| 2008/0003172 A1* | 1/2008 | Dziadyk | C01B 7/195 423/484 |

FOREIGN PATENT DOCUMENTS

| | | |
|---|---|---|
| EP | 1195354 A2 | 4/2002 |
| ES | 2077842 T3 | 12/1995 |
| JP | 2005281048 A | 10/2005 |
| MX | 284844 | 3/2011 |
| RU | 2246444 C1 | 2/2005 |

\* cited by examiner

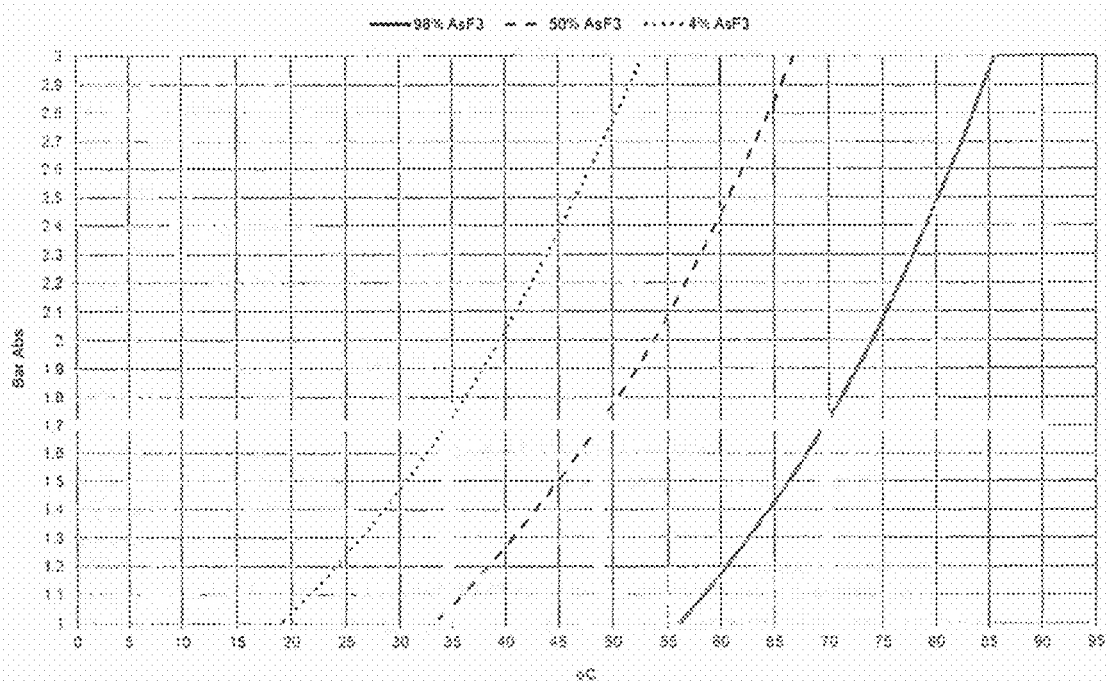

PROCESS FOR PURIFICATION OF HYDROFLUORIC ACID INCLUDING OBTAINING ARSENIOUS ACID BY-PRODUCT

FIELD OF THE INVENTION

The present invention refers to a high energy efficiency process for purifying anhydrous hydrofluoric acid by separating it from non-volatile compounds such as arsenic trifluoride ($AsF_3$) through special distillation conditions and generating a residue that can be potentially transformed into commercial arsenic products such as arsenic trioxide $As_2O_3$ which is raw material for specialty products.

BACKGROUND OF THE INVENTION

The calcium fluoride mineral used for the production of anhydrous hydrofluoric acid (HF) has several levels of contaminants including arsenic, which is mainly in the form of arsenic oxide ($As_2O_3$). This compound is converted into arsenic trifluoride ($AsF_3$) during HF production, this species remaining throughout the process and exiting together with the final product, the concentration of which depends on its entry concentration.

The presence of AsF3 in hydrofluoric acid is undesirable for those processes in which arsenic can be oxidized and change into the arsenic pentafluoride (AsF5) form, which is a very aggressive compound that can damage the integrity of the equipment exposed. For example, in the coolant manufacturing process, AsF3 is converted to AsF5, which poisons the catalyst and attacks metals. Therefore, it is desirable to minimize the presence of arsenic in hydrofluoric acid.

There are large deposits of fluorite with high arsenic content. To use the material these sources different processes have been used for the purification of HF, among which are the following:

Oxidation. For removing AsF3 from HF processes have been developed whose principles are oxidation reactions such as those listed in patent U.S. Pat. No. 3,166,379 (Bradley), which uses iodine, bromine or chlorine and an oxidizer such as potassium permanganate, or patent U.S. Pat. No. 3,689,370 (Osaka) using an oxidant such as permanganate and an iron salt in addition to impurities formed by the oxidant. Furthermore, patent CN 1,931,709 (Yin Fuhua) also uses potassium permanganate plus distillation, absorption, and filtration to remove impurities from HF. There are also patents U.S. Pat. No. 4,032,621 (Meadows) using an oxidizing agent and a reducing agent (hydrogen peroxide) and U.S. Pat. No. 4,083,941 (Jayawant) using hydrogen peroxide and methanol or sulfuric acid. Patent RU 2,246,444 (Varfolomeev) also uses potassium permanganate and potassium bifluoride and is subsequently distilled to obtain anhydrous HF of acceptable quality. The use of elemental fluorine and chlorine as an oxidizing agent is also described in patents U.S. Pat. No. 4,491,570 (G. Wheaton) and U.S. Pat. No. 4,668,497 (Miki Nobuhiro) respectively. Another patent of Chinese origin, CN 101,597,032 (Dingjun) uses hydrochloric acid, potassium permanganate and sodium hydroxide to oxidize arsenic and through several distillation steps obtains electronic grade hydrofluoric acid. There is also patent U.S. Pat. No. 5,047,226 (R. Schon) using potassium permanganate and potassium bifluoride is added as ion donor.

Hydrogen peroxide is added in other methods of oxidation as an oxidizing agent and in addition, catalysts such as molybdenum, vanadium, phosphorus, or similar compounds are added, such as in patent U.S. Pat. No. 4,756,899 (Jenczewski et al).

There are two patents in Mexico with the same principle as the above, which are: MX 165,894 (Morgan, B. Barry) and MX 167,322 (B. Barry, C. Redmon). Patent U.S. Pat. No. 4,929,435 (Kunkel-Redmon) further uses hydrogen peroxide, ammonium molybdate and sodium tripolyphosphate catalyst in a reactor with external cooling system, is subsequently heated and then distilled generating low-As HF.

The use of potassium permanganate for oxidation is still recurrent in patents, but they also perform a distillation with an ion purification column as mentioned in patent U.S. Pat. No. 6,063,356 (Hoffman) where a distillation is performed and potassium permanganate, ammonium persulfate and a potassium fluoride salt are added with an HF ionic purification.

In addition to the above oxidation methods, in patent U.S. Pat. No. 4,668,497 (Miki) oxidation of HF impurities such as arsenic is carried out using elemental fluorine in the form of gas mixed with other inert carrier compounds and subsequently separation is performed by distillation. This same method was developed in patents: JP 2005-281048 (Z. Hiroto) and U.S. Pat. No. 5,362,469 (Seseke-Koyro).

As to patent MX 171,054 (Ziegenhain) the oxidant used to convert trivalent arsenic to pentavalent arsenic is hexavalent chromium oxide and oxygen, subsequently distilled to recover pure HF.

Unlike the above, patent U.S. Pat. No. 6,346,227 (Lailach) first uses a distillation column to remove low boiling point compounds, and then adds elemental fluorine to oxidize arsenic and subsequently another distillation at ambient pressure. Something similar to patent EP 1,195,354 (Reinhold, Lailach, Peters) wherein trivalent arsenic is oxidized by amines and/or activated ammonium, and a double distillation with carbon steel columns and pressures of 0.9-1 bar-a.

Patent MX 162,803 (Garder) refers to an oxidation by adding elemental chlorine and anhydrous hydrogen chloride. Also patent CN 101,597,032 (Dingjun XIAO) speaks of the removal of impurities (including As) using anhydrous hydrochloric acid. Additionally, patent 171,259 MX (Gumprecht) uses sulfur to oxidize arsenic and in patent MX 172,980 (Gumprecht) uses iodine to achieve the same end.

Permeation. Patent U.S. Pat. No. 4,424,067 uses permeation membranes operating at high pressures. Electrolytic oxidation. Patents U.S. Pat. No. 5,100,639 (Freire) and U.S. Pat. No. 5,108,559 (Motz) refer to electrolysis processes for purifying hydrofluoric acid.

Similarly, patents ES 2,077,842 (Craig), VE 1991-000249 (Genieve), CN 1054574 (Freire) uses electrolysis for removal of arsenic in hydrofluoric acid.

Furthermore, there is Spanish patent ES 2,090,599 (Eileen) wherein an electrolytic oxidation is performed and subsequently the solution is distilled to obtain low arsenic HF. In addition to these, there are patents ES 2,077,842 (Barker), U.S. Pat. No. 5,108,559/U.S. Pat. No. 5,100,639 (Freire) that use the same principle for oxidation.

Evaporation. Patent U.S. Pat. No. 5,785,820 (Hoffman) uses a ionic purifier to remove impurities from HF; likewise, patent U.S. Pat. No. 5,722,442 (Hoffman) uses ammonia for the same purpose.

Filtration. Patent U.S. Pat. No. 4,952,386 (Davison) discloses a filtration through a cation exchange material and anion exchange material to remove arsenic ions.

Distillation. Oxidation processes form further compounds that are usually commercial impurities for hydrofluoric acid, so that an additional distillation process is required for separation thereof.

In addition, oxidants may form rapid decomposition unstable compounds that can cause problems in the safety of operation. As an alternative to this processes are those described in patents U.S. Pat. No. 3,663,382 (Garris) which describes a distillation process operating at low pressure (less than 25 psia) and patent U.S. Pat. No. 3,687,622 which discloses a distillation process operating at high pressures (above 165 psia). These processes have the disadvantage of operational cost because a lot of energy is required for both evaporation and condensation thereof. Furthermore, the process described in said patents starts from a concentration of 72 ppm at 100% reflux.

Additionally, we also have patent JP 2000-239002 (Guenter) in which HF is distilled at low pressures (14.2 psia) and an acid is obtained with a 60 to 90% concentration by weight. There is also patent US 2002-0001553 (Bulan Andreas) patent in which only the bottoms of the distillates are treated by evaporation and then neutralized with calcium salts.

In patent MX 284,844 (A. Juarez), apart from distillation under special conditions, use is disclosed of a second column in order to concentrate the purge and generate an arsenic byproduct with a +3 valence, (As+3) which is neutralized with calcium hydroxide (Ca(OH)2) to form CaF2 and As2O3, both products in solid form which are difficult to separate by conventional means.

The present invention proposes a high energy-efficient system for purification of HF, yielding an $AsF_3$ concentrate product of up to 98% by weight. Also, it provides a solution for the safe handling of this product while maintaining the potential to turn it into arsenic commercial products such as arsenic trioxide (As2O3) and lithium hexafluoroarsenate (LiAsF6), which are high commercial value compounds.

BRIEF DESCRIPTION OF THE FIGURES

FIG. 3 shows the operating conditions that the process must have for determining the concentration of arsenic in the bottom of the concentrator column. As an example, if the operating pressure of the concentrator column is 0.7 bar=1.7 bar abs, then a horizontal line is drawn at this pressure. The line crosses the three curves: the first curve indicates the concentration of 4% AsF3 and an approximate temperature of 34 degrees Celsius is read. That is, if the pressure is 0.7 bar and the temperature is 34° C., then the concentration is 4% of AsF3. The same can be read for the curve of 50% AsF3 wherein the temperature of 49° C. is located, and the most important reading is indicated by the curve of 98% AsF3, where it is interpreted that operating at 0.7 bar (or 1.7 bar Abs), when the bottom temperature reaches 70° C., a concentration of 98% shall be achieved and the column will be ready to purge.

DETAILED DESCRIPTION OF THE INVENTION

Figure 1:
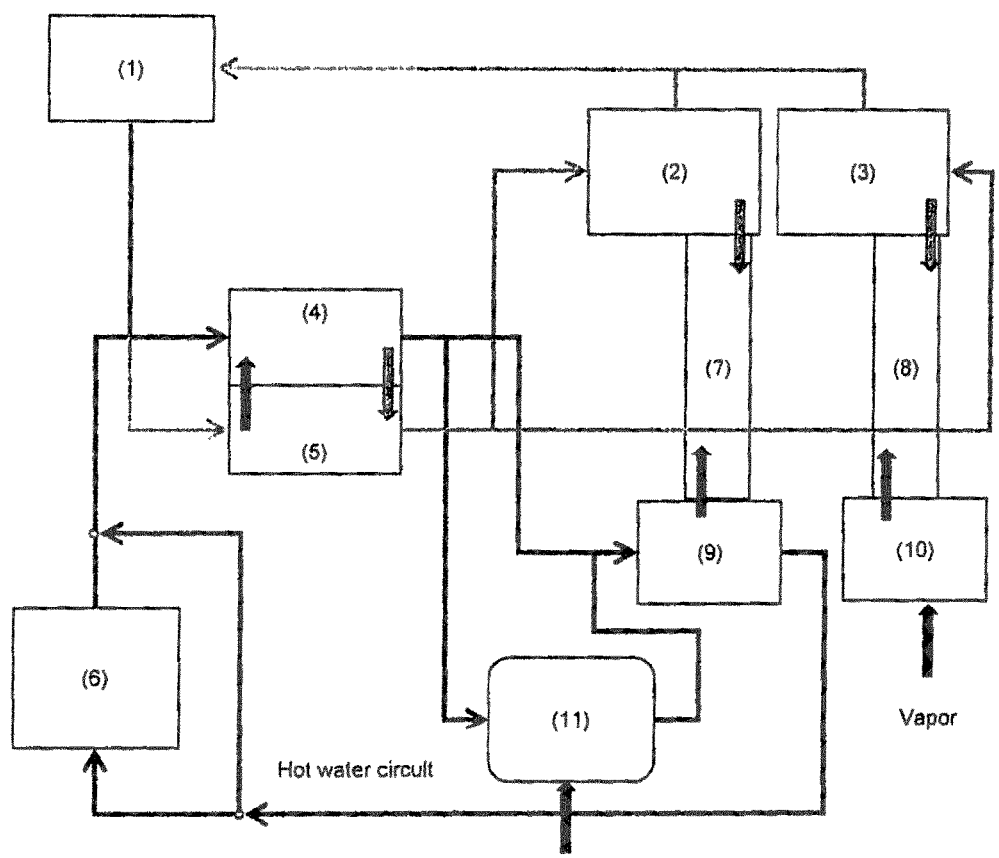
FIG. 1 shows the energy coupling between the hot water and cold water circuit where (1) represents the chilled water tank, (2) is the condenser of column P, (3) is the column condenser C, (4) is the cooling machine condenser, (5) is the cooling machine evaporator, (6) are the cooling towers, (7) is column P, (8) is column C, (9) is the reboiler of column P, (10) is the reboiler of column C and (11) is the water heater.

In the process of obtaining HF the mineral fluorite is used, which is reacted with sulfuric acid to yield calcium sulfate (CaSO4) and hydrofluoric acid (HF).

When fluorite is used it has a high arsenic content (approximately 350 ppm as As), the hydrofluoric acid product will have approximately twice the concentration of arsenic in fluorite, i.e., the HF product will have about 700 ppm.

Arsenic that leaves with HF forms the compound AsF3, arsenic trifluoride. Therefore, by relating their molecular weights (As=74.9159 and AsF3=131.9168), it can be calculated that 700 ppm of As is equivalent to 1232 ppm of AsF3.

Both the HF purification process to reduce the content of arsenic (as AsF3) and the treatment of waste AsF3 to achieve a highly energy efficient operation are disclosed in the following, as well as integrating the hot water and cold water circuits, essential for achieving a highly energy efficiency process.

HF Purification (Removal of AsF3)

1. Feeding High-Arsenic HF to the Purifying Column

High AsF3 content HF (1,000 to 5,000 ppm as AsF3, its typical value being 1230 ppm AsF3), is fed to a packed column, selecting the feed point depending on the physical conditions of pressure and temperature of the inflow.

2. Evaporating HF at the Bottom of the Purifying Column.

HF entering the selected point, falls to the bottom of the column where it is evaporated using a reboiler, which uses hot water from a hot water circuit which will be explained later.

The evaporation temperature of HF at the bottom can range from 20-30° C., being a temperature of 26° C., when the pressure is maintained at 0.25 kg/cm2.

3. Condensing the HF that Leaves the Dome of the Purifying Column.

HF evaporated in the bottom of the column passes through the packed section and reaches the dome in the form of a gas. Through this way, it will meet with liquid HF coming as a reflux when the condenser is put into operation.

In this process it is stated that 80 theoretical packing stages shall be sufficient to achieve the objectives set forth herein.

HF exiting the dome of the purifying column is conducted by a pipe to a condenser, which uses ice water to transform gas HF to liquid HF. Ice water comes from the ice water circuit which will be explained later.

HF shall be condensed at about 24.7° C., when the condenser pressure is maintained at 0.21 kg/cm2.

4. Returning Liquid HF to the Purifying Column.

A part of liquid HF which exits the bottom of the condenser is sent back to the top of the column. And another part is led to the system output. HF flow returned to the column is known as "reflux" and the flow of HF leaving the system is known as distillate.

The reflux has a very important role in holding the mass transfer within the column, thus achieving to scrub AsF3 from the rising gas.

The reflux/distillate ratio that the process states as an innovation ranges from 3.1 to 3.6, the value of 3.20 being preferable. It is noted that the concentration of arsenic in the HF output depends directly on the reflux/distillate ratio, achieving values below 1 ppm when reflux is 3.6 and approximate values of 10 ppm when it is 3.1; for the process herein disclosed it is stated that less than 5 ppm As values can be achieved when the reflux is 3.20.

5. Purging the Bottom of the Purifying Column.

The bottom of the purifying column contains a large amount of AsF3 whose concentration can vary from 20,000 ppm to 60,000 ppm, depending on temperature, so there must be a direct output current (drain) which may be from 1 to 2% of the feed to the column, preferably 1.5%. This current carries a large amount of HF to be recovered, the recovery of which is an integral part of this invention in order for the above process to be economically profitable and generates less waste.

It is now disclosed how the present invention handles the purge of the column bottom so as to concentrate it and recovers the HF which is therein. For such reason this part of the process is identified as "concentration of AsF3".

Concentration of AsF3

6. Feeding High-AsF3 HF (20,000 to 60,000 ppm) to the Concentrator Column.

The bottom of the purifying column is fed to an entry point of the concentrator column, which is determined by the pressure and temperature thereof. The concentrator column is a packed column with about 36 theoretical stages.

7. Evaporating High-AsF3 HF at the Bottom of the Concentrator Column.

The high-AsF3 HF fed to the concentrator column falls to the bottom thereof where it is evaporated using a reboiler handling low pressure (1 kg/cm2) vapor.

The temperature of the bottom of the column will increase as the AsF3 is concentrating and may rise from 30 to 70° C., when it works at a pressure of 0.7 kg/cm2. In the graph of FIG. 3 other operating conditions of the column bottom according to the working pressure may be seen.

8. Condensing the HF Gas Leaving the Dome of the Concentrator Column.

The vaporized HF comes out in the form of a gas from the dome of the concentrator column and is driven by a pipe to a condenser, which also uses ice water to make convert the gas HF to liquid HF. Ice water comes from the ice water circuit which will be explained later.

9. Returning Liquid HF to the Concentrator Column.

A part of the liquid HF which exits the bottom of the concentrator column condenser is sent back to the top of the column. And the other part is returned to the entrance of the purifying column, recovering the HF. The concepts previously described with reflux/distillate are also applicable to this concentrator column, being in this equipment that the reflux/distillate ratio that the process states as innovation goes from a range of 10 to 15, the value of 12 being preferred. It is noted that the concentration of arsenic in the output of the concentrator column has a quality similar to that used at the entrance of the purifying column, i.e., containing about 1232 ppm as AsF3, so it can be mixed with the feed stream to the purifying column and returned to the process.

10. Purging the Bottom of the Concentrator Column.

An important part of the present invention is how to operate the bottom of the concentrator column, i.e., unlike the purifying column, where the purging is continuous, the concentrator column keeps its purging closed until achieving a concentration of about 98% AsF3 and to realize having arrived at this concentration there are at least two options: the first involves taking a sample and analyzing the compound in the laboratory, and the second, which is claimed in this invention is to decide that the column has reached its appropriate concentration using the curve shown in FIG. 3, wherein upon reaching the temperature and pressure conditions indicated in the curve, it shall mean that the concentration is about 98% AsF3. Thus, the present process shows a great advantage by avoiding the handling of concentrated AsF3 in the laboratory.

Once the specified conditions have been reached, the operation of the concentrator column is stopped and is purged to a tank where 98% concentrate AsF3 will be received.

This invention included the purge treatment to prevent the generation of more waste when neutralizing it and convert it with high viability into commercial compounds. This process is also considered an important part to integrate the expectation of high energy efficiency and low cost and is identified as AsF3 hydrolysis or dilution process.

Hydrolysis of ASF3

11. Storing the AsF3

It is needed to receive the purge from the concentrator column in a tank of special alloy, because the temperature thereof exceeds 70° C. This compound of high AsF3 concentration is allowed to cool to room temperature.

12. Hydrolyzing AsF3 Purge by Reaction with Water.

To carry out hydrolysis of AsF3, it is reacted with water, wherein water is first added into a reactor with stirring at a rate of 60% of the total mass. The AsF3 is then slowly added up to 100% of the total mass ensuring that the temperature resulting from hydrolysis does not exceed those recommended by the manufacturer of building materials, which for chlorobutyl coating represents a maximum value of 60° C.

Figure 2:
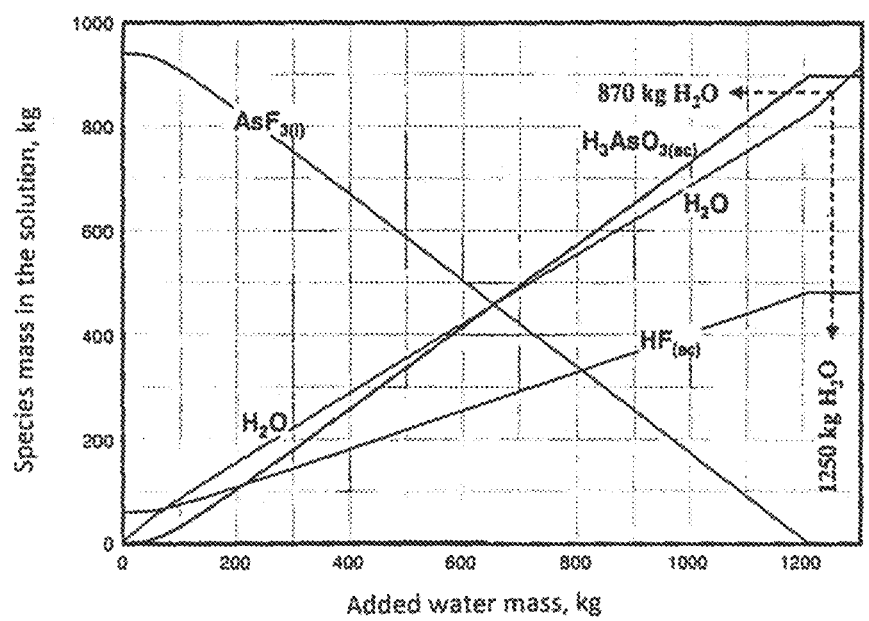
FIG. 2 shows the graph of arsenic species formation, where the ratio that should be present between AsF3 and water is seen, so that the AsF3 is fully hydrolyzed and arsenious acid (H3AsO3) is formed, which, unlike AsF3, has a vapor pressure low enough to avoid the presence of arsenic in the air thereby achieving a safe handling.

FIG. 2 shows the formation of HF species, H3AsO3. In the process herein described a surplus of water is added so that the HF to be formed has a 1:2 ratio as compared to water, i.e., the final target mixture is 40% H3AsO3, 40% H2O, and 20% HF.

The advantage of this last step is the formation of the species H3AsO3, arsenious acid, which has a low vapor pressure, thus avoiding the incorporation of arsenic into the environment.

In addition, arsenious acid has the potential to become a raw material for the processes of obtaining As2O3, As2S3 and others who require to maintain the oxidation value of arsenic at +3, since it is not altered during hydrolysis.

The process steps relating to the energy integration both of the hot water and ice water circuit shall be disclosed in the following.

Energy Integration

The energy integration is achieved by operating the hot water and ice water circuits, as described below, this being an essential and innovative part with respect to the reference technologies, thus achieving a high energy efficiency process.

13. Recirculating Water in the Hot Water Circuit.

The hot water circuit is put in operation, through which water will flow that comes out of the cooling towers to the cooling machines, where the water shall have the role of condensing the refrigerant inside the machines; when performing this condensing of the refrigerant, the water will be slightly heated so that it will first pass to a steam heater to be reheated up to a temperature of 36° C. With this acquired energy, the hot water will be fed to the reboiler of the purification column (see step 2 of the process) where it will have enough heat to evaporate the HF. The water shall output the reboiler and will be sent again to the cooling towers.

As the system is stabilizing in its capacity, the cooling machines will increase their energy load and achieve that the water from the circuit comes out at an increasingly higher temperature. This enables the use of the steam heater to be disposed of, so the water leaving the cooling machine (refrigerant condenser side) may be directly fed to the reboiler of the purifying column, achieving the elimination of the use of steam for heating.

The reboiler, when evaporating HF, shall cool the water coming out therefrom into the cooling towers, which work with variable speed fans. Since the water will return at a temperature close to 30° C. (extent required to introduce the water to the condenser side cooling machines), the fans of the tower will decrease their operation thus achieving an energy reduction and reduced water loss due to the operation of the cooling tower.

14. Recirculating Water in the Ice Water Circuit.

Simultaneously with starting the hot water circuit, the recirculation of the ice water circuit is initiated so it feeds water from an ice water storage tank to the cooling machines. As water passes through for evaporator side cooling machines of the coolant, it is cooled to a temperature below 17° C. (preferably 15° C.), and is taken to the two condensers both of the purifying column (see step 3) and the concentrator column (see step 8), to condense HF in both cases. On leaving both condensers water will return hot to the ice water storage tank, to be resend to the cooling machines.

As the operation stabilizes and the condensers of the columns receive more HF to be condensed, the water will return getting hotter, increasing the thermal load on the cooling machines.

15. Energy Integration.

When both circuits operate simultaneously, the cooling machines can be used both as water coolers and as water heaters (heat pump) while maintaining an energy balance with minimum consumption allowing to declare the present HF purification process for the removal of arsenic as the lower cost due to its energy efficiency as well as the minimum waste generation, compared to currently known processes.

Hot and cold water circuits are made up as explained below:

HOT WATER CIRCUIT.—This circuit is formed by:
i. Cooling machines (condenser side of refrigerant).
ii. Water heater.
iii. P column reboiler.
iv. Cooling towers.

ICE WATER CIRCUIT.—This circuit consists of the following components:
v. Cooling machines (Evaporator Side of refrigerant).
vi. HF gas condenser of purification column.
vii. HF gas condenser of concentrator column.

The energy required to condense the HF is supplied by the evaporator side cooling machines of the refrigerant. The energy balance is achieved by the operation of the cooling machines, which equal the thermal loads of the condenser (heat transferred) and the evaporator (heat absorbed) of the refrigerant.

Discussion of the Invention.

AsF3 distillation from HF does not meet theoretical calculations due to the affinity of the HF fluorine bonds with the AsF3 fluorine, so volatility coefficients must be determined experimentally.

Reference patent MX284844 solved arsenic trifluoride AsF3 separation, both for AsF3 purification (product less than 10 ppm of AsF3) and concentration (90%), however the residue was to be neutralized with lime generating a considerable amount of this material (high cost of disposal).

The present invention is different from the indicated technology because in this new process, the concentration column simultaneously operates in two different ways, i.e., continuously operates in its gas phase by a continuous distillate output; and batch-wise in its heavy liquid phase from the bottom thereof, carrying out a purge of the column until the operative conditions indicate that a concentration equal to or greater than 98% of AsF3 is achieved. This invention includes the use of the operating curve shown in FIG. 3, same that when is used predicts the concentration of arsenic in the bottom of the column thereby avoiding the continuous process sampling.

Also, the operation of the purification column changes because the operating pressure is changed to values below 0.3 kg/cm2 thus reducing the energy consumption of the process by requiring less energy in the circuit, and in addition obtaining a product with a lower concentration of 5 ppm AsF3.

This process involves the integration of energy by the formation of two circuits which are shown in FIG. 1. The ice water circuit is in charge of HF gas condensation in the distillation columns, which uses water cooled by cooling machines which is fed to the purification column condenser and to the column condenser and returns back to the cooling machine. The energy required for condensation is the energy used by the cooling machine. The hot water circuit in turn, begins with water coming from the cooling tower and goes to the ice water machine (condenser side of the refrigerant), where it exits with such energy that is capable of evaporating the HF, by which is led into an evaporator (column reboiler of column P) and returns to the cooling towers. The present invention includes the use of the refrigerating machine in dual form, that is, for cooling water from the ice water system while heating water in the hot water circuit by working also as a "heat pump" since the energy to evaporate HF is the same energy that is required to condense it but in reverse.

The present invention includes a water heater that is used only in the beginning to activate the operation of these circuits so they can be integrated; once the circuits are integrated water heater is put out of operation. At the same time, the water flow to the cooling towers is diverted directly into the basin of the tower thus achieving a saving in replacement water consumption and an energy reduction by not requiring to operate the fans of the cooling tower to 100%

By using the integration of these systems, the operating cost decreases considerably which proclaims this system as the one of the highest energy efficiency as compared to other similar systems.

Furthermore, this invention solves the problem of emission of arsenic to the environment which occurs when handling the solution from the bottom of the concentrator column, as it turns it into another product of lower vapor pressure, that is, the present invention states that the arsenic solution (AsF3) is hydrolyzed to another product of lower vapor pressure: arsenious acid (H3AsO3) by the following reaction:

$$AsF3+3H2O \rightarrow H3AsO3+3HF$$

The studies performed show that what is expressed in FIG. 2 should be conducted to ensure complete hydrolysis of AsF3 and therefore requires that the purge dilution is at least 40% AsF3 plus 60% water. This process has been called arsenic dilution.

The purge of the concentrator column is hydrolyzed from AsF3 to H3AsO3 (arsenious acid) having physicochemical properties that allow safe handling because a low vapor pressure is maintained, which reduces arsenic emissions into the atmosphere.

As shown, the hydrolysis of AsF3 still keeps the arsenic oxidation number at +3, which is an important feature of the present process herein protected, since this product may generate arsenic chemical compounds of high commercial value, without performing any chemical reduction.

In reference patent MX284844, the process consists of only two steps: Purification and Concentration. A third new step is added in this new patent called Dilution.

Also in this new invention the ice water and hot water circuits are disclosed, which dramatically reduce the operating cost, making this process the one with the highest energy efficiency and lowest cost than is known today, unlike the processes described above.

EXAMPLES

Example A

Integration of Hot Water System

Equipment: Two (2) cooling machines of 500 TR each, a reboiler to evaporate HF with 435.2 m2, a 100.6 m2 water heater, two (2) cooling towers of 500 TR each.

Operation: The water flow of the cooling tower is connected to the cooling machine (condenser side of the refrigerant). The output of the machine is connected to the water heater; the output of the water heater is connected to the re-heater that will evaporate the HF; the output of the re-heater is returned to the cooling towers and the pumps are started to recirculate water in this circuit.

Water vapor is fed to the heater in order to raise its temperature to about 36° C. to evaporate the HF. Once the cooling machines have thermal load in equilibrium, the temperature of the water leaving the condenser of the machines is sufficient to maintain itself the evaporation of HF in the re-heater, which can deviate the water flow to the steam heater and go directly to the cooling towers, leaving the water heater out of operation, and meaning energy savings which is claimed in this invention.

Example B

Operation of the Concentrator Column

Equipment: 23.6 Meters height packed column, 11.6 square meters shell and tube condenser and 3.2 square meters tube and shell superheater.

Services: Ice water with a flow of 19.1 m3/hr at 15° C. 15 psig steam with a flow rate of 196 kg/hr.

Operation. A flow of 90 kg/hr HF with about 40,000 ppm As is continuously fed. A backflow of 1 ton/hr is maintained, operating the column at a pressure of about 0.2 to 0.6 kg/cm2.

The column is purged until the bottom temperature rises to about 70-72° C., when it is operating at 0.7 kg/cm2, which means that AsF3 98% has been concentrated in the bottom. There are final temperatures for different operating pressures, which are shown in FIG. 3. The purge is transferred to a receiving tank and subsequently will be ready to be treated.

Example C

Conversion of AsF3 Purge in Arsenous Acid

Equipment: About 2 m3 tank, a 10 m3 tank and a third 10 m3 tank.

Services: Wastewater with residual arsenic.

Operation: Whenever the concentrator column reaches 72° in the bottom, which means a concentration of 98% AsF3, it is transferred to the 2 m3 purge receiving tank, otherwise the dilution tank is prepared by filling the tank with water containing arsenic residues at 60% of its capacity, to later transfer the purge receiving tank to complete 100% of dilution tank level. In this ratio the entire AsF3 will have been hydrolyzed to H3AsO3 generating HF as by-product and excess water. A typical final hydrolysis composition will contain 40% H3AsO3, 40% H2O and 20% HF. The indicated values are given as examples but these will change depending on the dilution performed.

Having claimed the invention as above, it is claimed as property what is contained in the following claims:

1. A process for purifying hydrofluoric acid including obtaining an arsenious acid ($H_3AsO_3$) byproduct, comprising the steps of:
   (A) PURIFICATION OF HF (REMOVAL OF $AsF_3$):
      (a1) Feeding high-arsenic HF to a purifying column;
      (a2) Evaporating the high-arsenic HF at a bottom of the purifying column;
      (a3) Condensing low-arsenic HF that leaves a dome of the purifying column into liquid HF;
      (a4) Returning a portion of the liquid HF that has left the purifying column to the purifying column; and
      (a5) Purging the bottom of the purifying column,
   (B) CONCENTRATION OF $AsF_3$:
      (b6) Feeding high-arsenic $AsF_3$ HF, which has an arsenic concentration of 20,000 to 60,000 ppm by weight, to a concentrator column;
      (b7) Evaporating the high-arsenic $AsF_3$ HF at a bottom of the concentrator column;
      (b8) Condensing HF gas leaving a dome of the concentrator column into liquid HF;
      (b9) Returning at least a portion of the liquid HF that has left the concentrator column to the concentrator column; and
      (b10) Purging the bottom of the concentrator column,
   (C) HYDROLYSIS OF $ASF_3$:
      (c11) Storing the $AsF_3$; and
      (c12) Hydrolyzing $AsF_3$ purged by the concentrator column by reacting the $AsF_3$ with water,
   wherein the purifying and concentrator columns are provided in a system containing a cold water circuit and a hot water circuit connected with the columns.

2. The process according to claim 1, wherein, in the step of feeding high arsenic HF to the purifying column, the high arsenic HF fed to the purifying column has an $AsF_3$ concentration of 1,000 to 5,000 ppm by weight.

3. The process according to claim 1, wherein the evaporation of the high arsenic HF in the bottom of the purifying column uses a reboiler, and
   wherein an evaporation temperature of the high arsenic HF at the bottom of the purifying column ranges from 20 to 30° C.

4. The process according to claim 1, wherein
   the low-arsenic HF exiting the dome of the purifying column is taken by a pipe to a condenser that uses cold water to convert the HF gas to the liquid HF; and the low-arsenic HF is condensed at 24.7° C. when the condenser pressure is maintained at 0.21 kg/cm².

5. The process according to claim 1, wherein the step of returning the liquid HF to the purifying column achieves values from less than 1 ppm to 10 ppm of As when an amount of reflux is from 3.6 to 3.1.

6. The process according to claim 1, wherein
the evaporation of the high-arsenic $AsF_3$ HF in the bottom of the concentrator column uses a reboiler which receives low pressure vapor; and
during evaporation, temperature of the bottom of the concentrator column rises from 30 to 70° C. under a pressure of 0.7 kg/cm².

7. The process according to claim 1, wherein condensing the HF gas leaving the dome of the concentrator column comprises using cold water to convert the HF gas to the liquid HF.

8. The process according to claim 1, wherein, in the step of returning the liquid HF to the concentrator column, a ratio of reflux to distillate is 10 to 15.

9. The process according to claim 8, wherein
the HF gas which exits from the concentrator column has about 1232 ppm $AsF_3$, and
the process further comprises mixing the $AsF_3$ from the HF gas with a feed stream to the purifying column to form a mixture, and purifying the mixture.

10. The process according to claim 1, wherein in the step of purging the bottom of the concentrator column, the concentrator column prevents purging until a concentration of $AsF_3$ is approximately 98% when a pressure is 0.7 bar (or 1.7 bar Abs), and when a temperature of the bottom of the concentrator column reaches 70° C.

11. The process according to claim 1, wherein
in the step of hydrolyzing the purged $AsF_3$ by reaction with water, the water is added to a reactor by stirring at a rate of 60% of a total mass in the reactor, $AsF_3$ is slowly added until reaching 100% of the total mass at a temperature resulting from hydrolysis not exceeding 60° C.; excess water is added so that the HF to be formed has a 1:2 ratio when compared to water, such that a final target mixture is 40% $H_3AsO_3$, 40% $H_2O$ and 20% HF; and wherein the $AsF_3$ maintains an arsenic oxidation number of +3.

12. The process according to claim 1, wherein
the hot water circuit, water which has exited from cooling towers to coolers condenses refrigerant inside the coolers, and water that first passes to a steam heater is reheated until the water reaches a temperature higher than 36° C., in order to feed a reboiler of the purification column for evaporating the high-arsenic HF; and
water exits the reboiler and is sent back to the cooling towers, where the water of the hot water circuit leaves at an increased temperature, so as not to require the use of the steam heater.

13. The process according to claim 11, wherein, in the hot water circuit, a reboiler provided with the purification column, when evaporating the high-arsenic HF, cools water coming out thereof into cooling towers, which work with variable speed fans;
wherein the water returns to a temperature of approximately 30° C., water is added to condenser side coolers, and
wherein the fans reduce operation to achieve energy reduction and reduced water loss due to operation of the cooling towers.

14. The process according to claim 1, wherein the cold water circuit operates together with the hot water circuit, and the cold water circuit feeds the coolers from a cold water storage tank which is cooled to a temperature under 17° C. and is fed to condensers in the purifying column and the concentrator column to condense the high arsenic HF, and
wherein as operation of the system stabilizes and the condensers of the purifying column and the concentrator column receive additional high-arsenic HF to be condensed, water in the system becomes hotter, thereby increasing a heat load on the coolers.

15. The process according to claim 1, wherein the hot water and cold water circuits perform cooling and heating of the water while maintaining an energy balance with a minimum consumption of energy.

* * * * *